3 Sheets—Sheet 2.

W. P. & C. E. CLARK.
Horse Hay-Rake.

No. 222,382. Patented Dec. 9, 1879.

Attest:
Chas. M. Higgins,
Randolph Hurry.

Inventors:
William P. Clark
Charles E. Clark
by
S. H. Wales & Son
Attys

N. PETERS, PHOTO-LITHOGRAPHER, WASHINGTON, D. C.

3 Sheets—Sheet 3.

W. P. & C. E. CLARK.
Horse Hay-Rake.

No. 222,382.      Patented Dec. 9, 1879.

Attest:
Chas. M. Higgins
Randolph Hurry

Inventors:
William P. Clark
Charles E. Clark
by
S. H. Wales Jr.
Attys

UNITED STATES PATENT OFFICE.

WILLIAM P. CLARK AND CHARLES E. CLARK, OF BELMONT, NEW YORK.

IMPROVEMENT IN HORSE HAY-RAKES.

Specification forming part of Letters Patent No. 222,382, dated December 9, 1879; application filed February 19, 1879.

*To all whom it may concern:*

Be it known that we, WILLIAM PENDLETON CLARK and CHARLES ETHAN CLARK, of Belmont, county of Allegany, and State of New York, have invented certain new and useful Improvements in Horse Hay-Rakes, of which the following is a specification.

Our present invention lies in an improved form of clutching or automatic lifting mechanism, which connects the pivoted rake with the revolving axle of the wheels, by which the rake is automatically raised to drop the collected hay at the desired moment; also, in an improved construction of the pressure lever or levers by which the rake is held down to the work, and in an improved form of sockets, in which the rake-teeth pivot, which embody a number of novel features, as hereinafter fully set forth.

Figure 1:
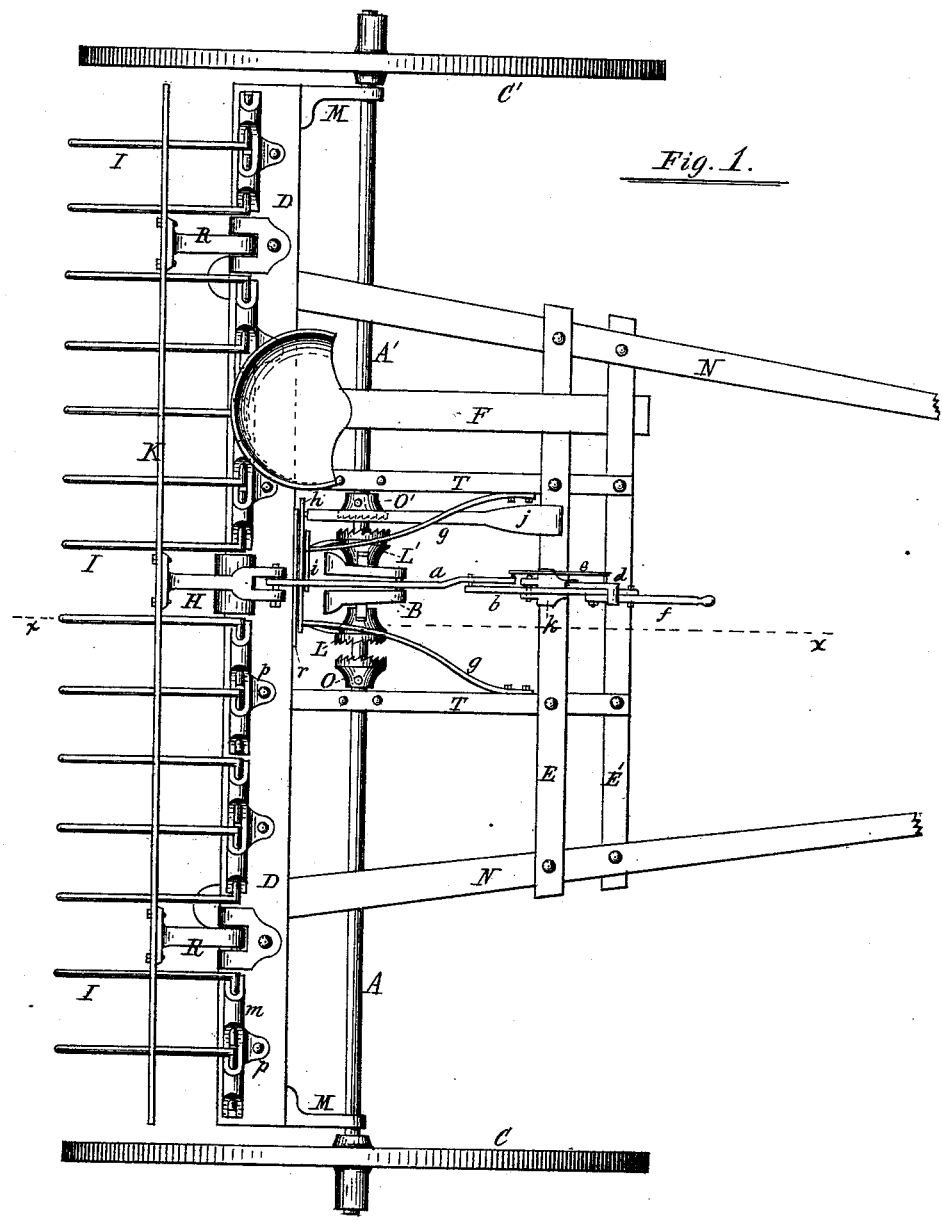
Figure 2:
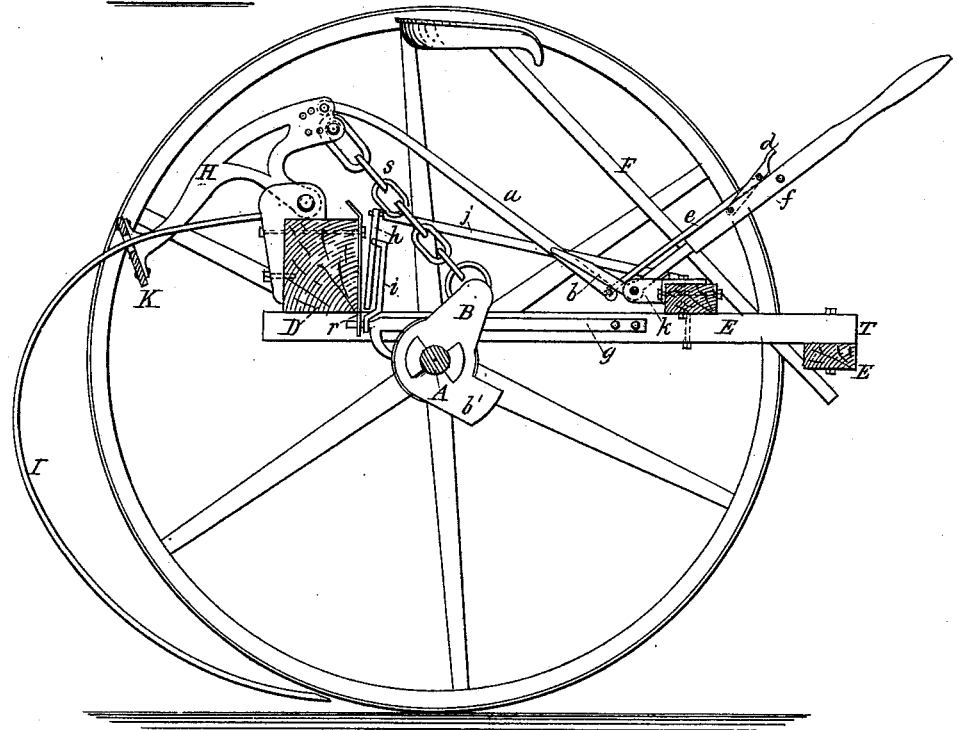
Figure 5:
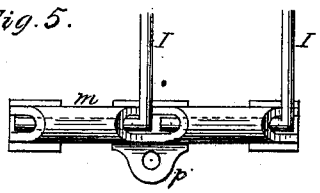
Figure 6:
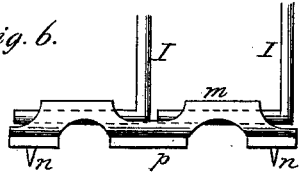
Figure 7:
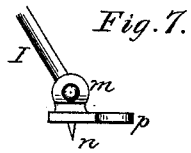
Figure 3:
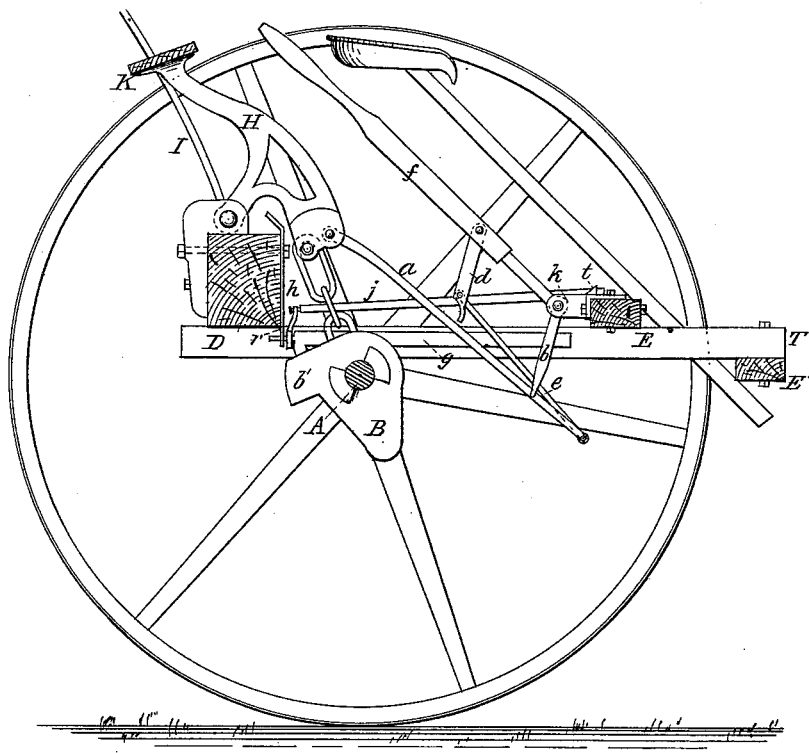
Figure 4:
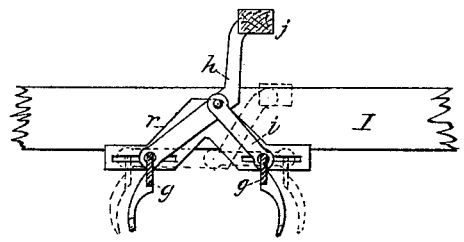
Figure 8:
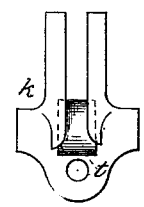

In the annexed drawings, Figure 1 presents a plan view of our improved rake, the front portion of the thills being broken off. Fig. 2 is a sectional elevation on line X X of Fig. 1, with the rake shown depressed, and Fig. 3 is similar view, with the rake and rake-lifting mechanism in the raised position. Fig. 4 is a front elevation of a portion of the clutch-operating mechanism. Figs. 5, 6, and 7 give a plan view, and side and end elevations, respectively, of tooth pivot-sockets on an enlarged scale. Fig. 8 is an enlarged plan view of the fulcrum-block, in which the pressure-lever pivots, showing the elastic cushion socketed therein to receive the impact of the lever when the rake falls back after being raised.

In the drawings, D indicates the main timber of the frame of the machine, which forms the fixed part of the rake-head, and runs parallel with the axle, as shown, being provided with arms M, depending from each end, in which the axle is journaled close to the hubs of the wheels.

The thills N N project rigidly forward from the timber D, and they are connected at a distance in front of the timber by the cross-bars E E', which form the frame of the machine.

The rake-teeth are pivoted on the top of the head D in sockets of peculiar formation, as hereinafter described, and the teeth extend through short vertical slots in a transverse bar, K, running parallel with the head D and mounted on arms R H R, which are pivoted on the head D, as shown, this being about the usual arrangement in hay-rakes.

The central arm, H, which is of the form of a bell-crank lever, is connected, as usual, with a hand-lever, also adapted to receive the pressure of the foot, as shown in Figs. 1, 2, and 3, by which the teeth may be raised or held down to the work, and also with a device on the revolving axle, which may be clutched with the axle, at the will of the operator, to automatically raise the teeth. These connections are, of course, also usual in hay-rakes; but in our case they are of improved and novel construction, as will be now described.

The axle A A' of the driving-wheels C C' is divided, as shown in Fig. 1, each wheel being keyed to an independent half, and the two halves being arranged in line with each other, with the ends closely approaching each other at the center of the machine, as shown in Fig. 1.

At the approaching ends of the half-axles a double crank-arm, B, is loosely mounted thereon, jointly on the end of each half, as shown. The hubs of the crank on each side thereof are formed with prongs, which engage with corresponding prongs on one-half of a toothed clutch, L L', which is capable of a certain play back and forth upon the axle or axles. Close to these movable clutches are corresponding half-clutches O O', which are keyed to the respective halves of the axle, and revolve therewith. It will hence be seen that by sliding the loose halves of the clutches into engagement with the fixed halves the crank will become coupled with the axle so as to revolve therewith. The clutches L L' are operated thus by the spring-arms $g$ $g$, which are bolted at the forward ends to bars T, the back or free ends being guided horizontally in a slot in a plate, $r$, in the head D, while a downward prolongation from that end projects into grooves on the said clutches L L', as shown in Figs. 1, 2, and 3. These spring-arms are spread outward to move the clutches into engagement by the toggles $h\, i$, Figs. 1 and 4, one link of which is actuated by the depression of the usual foot-lever $j$. Now, the crank B is formed with a heavy protuberance, $b'$, on one end, forming a counter-balance, which causes that end of the crank, when not clutched with the axle, to gravitate so that the crank-pin assumes an upright position, which is its normal or inactive position, as shown in Fig. 2. Now, this crank-pin is connected, by the chain s, with the arm H of the pivoted rake-head, so that when the crank is clutched the crank revolves with the axle and lifts the rake, as shown in Fig. 3. It will be seen that when the toggles h i are spread the spring-arms g g become locked in the clutching position, so that the crank continues to revolve while the clutches are thus engaged. Now, the joint of the toggles h i is arranged in the path of the crank, so that it makes but a partial revolution, sufficient to lift the rake-teeth to the full height, when the protuberance b' on the crank strikes the toggles, as shown in Fig. 3, thus unlocking the same, causing the spring-arms g and clutches L L' to spring back to their original disengaged position, as shown in Fig. 1, thus allowing the rake-teeth to immediately fall back to the ground, the crank at the same time gravitating into its normal inactive position, as shown in Fig. 2.

It will be observed that this clutching and automatic lifting mechanism is very effective and complete, and answers all requirements of this class of machines. It will be seen that the arrangement of clutches with the divided axle is such that the crank will be revolved and the rake-teeth lifted by the action of either of the driving-wheels separately or both together. Hence the lifting action will be performed when the machine is in the act of turning a corner when one wheel is standing stationary or moving backward, as well as when both wheels are uniformly advancing. As the clutches are of ratchet form, and are held into engagement by the elastic pressure of the springs g, the teeth will slip when the machine is backed, without affecting the lifting mechanism, and when the machine is going forward the clutch of the wheel which is traveling the faster will always govern the movement of the lifting-crank, the other clutch slipping without any interference with the lifting action of the crank. The actuating-arm H of the pivoted rake is also connected, as usual, with the hand-lever f, by which the rake may be raised by hand when desired. This hand-lever is usually an elbow-lever, as shown, and is pivoted at its angle between the jaws of a fulcrum-block, K, Figs. 2, 3, and 8, which is bolted on the bar E. The short bent arm b of this lever is jointed to a connecting-rod, a, which is coupled at its opposite end to the arm H, as shown. A number of connecting-holes are formed in the arm H for the attachment of the chain s and rod a, to make the connection at any desired adjustment, as will be understood.

Now, the chief feature of novelty in our improved lifting and depressing lever mechanism consists in the compound toggle links or levers e d. One link, e, of the toggles pivots to the end of the connecting-rod in front of the point where the short arm b of the lever b f joints thereto, while the other link, d, pivots to the long arm f of the lever close to the fulcrum thereof, as shown in Figs. 2 and 3, and the end of this link, at or near the joint of the toggle, is adapted as a pedal to receive the pressure of the driver's foot, as shown.

It will be observed from Fig. 2 that when the teeth are depressed the toggles e d, lever b f, and rod a are in such position that the strain on the rake transmitted through the rod a comes almost in a line with the several fulcra or pivot-points, so that a very easy pressure of the toe on the pedal of the toggles e d serves to keep the rake-teeth held down to the work with great leverage, thus forming a very simple and powerful contrivance for this purpose.

The fulcrum-block k, (shown best in Figs. 2, 3, and 8,) in which the lever b f pivots, is provided with a socket between the pivoting-jaws and in front of the lever, formed preferably with dovetailed sides, in which an elastic cushion, t, Fig. 8, of rubber or leather is inserted. This cushion receives the impact of the lever on its sudden return movement, when the rake quickly falls back after being raised, and thus prevents any injurious shock or jar to the machine, and this device forms another feature of our invention.

The sockets in which the teeth are pivoted are of novel formation, and are made in sections, as shown in Fig. 1, one section containing two teeth, as shown enlarged in Figs. 5, 6, and 7.

The sockets consist, as shown, of a tubular sleeve, m, fixed on a sustaining base or lugs, p, by which the socket is bolted to the fixed head D, as shown, spurs n being cast on the under side of the base or lugs, which become embedded in the head D, and serve to hold the sockets more firmly in position.

The pivoted ends of the rake-teeth are bent at right angles to the body, as usual, the bend being equal to the distance between the teeth, and the bent portion is inserted in the bore of the sleeve through lateral openings therein, as shown in Figs. 5 and 6, which also permit the body of the tooth to project, and admit the free pivotal movements thereof, as will be understood.

The bent or pivotal ends of the teeth are inclosed in the tubular sleeve, as shown, with the end of one pivot against the angle of the next, and the several sections or sockets are arranged end to end, in longitudinal series, on the timber D, as shown in Fig. 1, so that the fixed position of one prevents the removal or lateral displacement of the teeth in the other, as will be understood. The sockets thus formed are made in one piece of cast-iron, and, as may be observed, are very simple and compact, and perfect in their action.

We have shown a double crank and a double arrangement of clutches in connection with a divided axle; but the crank may, of course, be made single, with a single clutch and single axle, without necessarily departing from the scope of this part of our invention, but at the same time the double arrangement shown is entirely preferable.

What we claim as our invention is—

1. The combination, in a hay-rake, of a fixed rake-head, a pivoted rake or series of pivoted rake-teeth, an independent revolving axle provided with a loose crank connected to the rake, and with clutches arranged to couple the crank with the axle, together with the locking spreading-toggles $h\,i$, and spring-arms $g\,g$, substantially as herein shown and described.

2. In a hay-rake, in combination with the rake-operating lever $b\,f$, and connecting-rod $a$, the toggles $e\,d$, arranged and operating substantially as herein shown and described.

3. In combination with rake-teeth having their pivotal ends bent at right angles, a tooth-holder or socket formed of metallic tubular sections, adapted to be fixed at their base on the rake-frame, and formed with lateral openings by which the tooth-pivots may be inserted in the tubular bore of the sockets, and through which the working ends play, the said rake-teeth being inserted in the said sockets with the end of one pivot against the angle of the next, while the sockets are arranged in longitudinal series end to end on the rake-frame, so that the position of one prevents the removal of teeth in the other, substantially as shown and described.

WILLIAM PENDLETON CLARK.
CHARLES ETHAN CLARK.

Witnesses:
V. A. WILLARD,
MEITT WILCOX.